(12) United States Patent
Du et al.

(10) Patent No.: US 11,635,933 B2
(45) Date of Patent: Apr. 25, 2023

(54) CROSS-DEVICE INFORMATION DISPLAY METHOD AND DEVICE, AND STORAGE MEDIUM

(71) Applicant: BEIJING XIAOMI MOBILE SOFTWARE CO., LTD., Beijing (CN)

(72) Inventors: Xutao Du, Beijing (CN); Ming Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 67 days.

(21) Appl. No.: 17/334,470

(22) Filed: May 28, 2021

(65) Prior Publication Data

US 2022/0129229 A1 Apr. 28, 2022

(30) Foreign Application Priority Data

Oct. 22, 2020 (CN) .......................... 202011137374.X

(51) Int. Cl.
| | | |
|---|---|---|
| G06F 3/14 | (2006.01) | |
| H04N 21/43 | (2011.01) | |
| H04M 1/72409 | (2021.01) | |
| H04N 21/41 | (2011.01) | |
| H04N 21/61 | (2011.01) | |

(52) U.S. Cl.
CPC ...... *G06F 3/1454* (2013.01); *H04M 1/72409* (2021.01); *H04N 21/4126* (2013.01); *H04N 21/43079* (2020.08); *H04N 21/6125* (2013.01)

(58) Field of Classification Search
CPC ......... H04N 21/6125; H04N 21/43637; H04N 21/4122; H04N 21/4126; H04N 21/43079; G06F 3/1423; G06F 3/1454; H04M 1/72409; G09G 2370/042

See application file for complete search history.

(56) References Cited

U.S. PATENT DOCUMENTS

| | | | |
|---|---|---|---|
| 2015/0095419 A1* | 4/2015 | Anantharaman | ........................... H04N 21/43615 709/204 |
| 2016/0041593 A1 | 2/2016 | DharaWat | |
| 2016/0110151 A1* | 4/2016 | Isonishi | ........... H04N 21/43637 345/2.2 |
| 2017/0075641 A1* | 3/2017 | Kwon | ............... H04N 21/42224 |
| 2018/0039318 A1 | 2/2018 | Dharawat | |
| 2019/0265938 A1* | 8/2019 | Kim | ..................... H04W 12/069 |
| 2020/0183525 A1* | 6/2020 | Liu | ......................... G06F 3/0416 |
| 2021/0334060 A1* | 10/2021 | Lee | ......................... H04W 76/10 |
| 2022/0030319 A1* | 1/2022 | Lee | .......................... G06F 3/162 |

FOREIGN PATENT DOCUMENTS

| | | | |
|---|---|---|---|
| EP | 3531659 B1 * | 9/2020 | ............. G06F 21/33 |
| EP | 3531659 B1 | 9/2020 | |

OTHER PUBLICATIONS

Supplementary European Search Report in the European application No. 21176615.9, dated Nov. 26, 2021, (7p).

* cited by examiner

*Primary Examiner* — Vinh T Lam

(74) *Attorney, Agent, or Firm* — Arch & Lake LLP

(57) ABSTRACT

A cross-device information display method and device, and a storage medium are provided. The method includes that a mobile terminal sends, real-time target information of the mobile terminal to a target device to allow the target device to display the target information in response to determining that the target device is a trusted device of the mobile terminal.

17 Claims, 15 Drawing Sheets

When a target device is a trusted device of the mobile terminal, real-time target information of the mobile terminal is sent to the target device, to allow the target device to display the target information — S11

When a target device is a trusted device of the mobile terminal, real-time target information of the mobile terminal is sent to the target device, to allow the target device to display the target information — S11

FIG. 1

CROSS-DEVICE INFORMATION DISPLAY METHOD AND DEVICE, AND STORAGE MEDIUM

CROSS-REFERENCE TO RELATED APPLICATIONS

The present application is based upon and claims priority to Chinese Patent Application No. 202011137374.X, filed on Oct. 22, 2020, the contents of which are incorporated herein by reference in their entirety for all purposes.

TECHNICAL FIELD

The disclosure relates to the technical field of communication data processing, and more particularly, to a cross-device information display method and device, and a storage medium.

BACKGROUND

The mobile terminal may be interconnected and intercommunicated with a variety of devices, with data of the mobile terminal being synchronized to other devices. For example, the data is synchronized to a display device from the mobile terminal through screen projection. However, in some application scenarios, the data may be projected to a wrong device.

SUMMARY

According to a first aspect of embodiments of the disclosure, a method for cross-device information display is provided. The method is applied to a mobile terminal, and includes that the mobile terminal sends real-time target information of the mobile terminal to a target device to allow the target device to display the target information in response to determining that the target device is a trusted device of the mobile terminal.

According to a second aspect of the embodiments of the disclosure, a device for cross-device information display is provided. The device may be applied to a mobile terminal. The device includes a processor and a memory configured to store instructions executable by the processor. The processor is configured to execute the instructions to send real-time target information of the mobile terminal to a target device to allow the target device to display the target information in response to determining that the target device is a trusted device of the mobile terminal.

According to a third aspect of the embodiments of the disclosure, a device for cross-device information display is provided. The device includes a processor and a memory configured to store instructions executable by the processor. The processor is configured to execute the instructions to: receive target information in response to determining that the device is a trusted device of a mobile terminal and the mobile terminal sends real-time target information of the mobile terminal to the device; and display the target information.

According to a fourth aspect of the embodiments of the disclosure, there is provided a non-transitory computer-readable storage medium having stored thereon executable instructions that when executed by a processor, implement steps according to the first aspect.

It is to be understood that the foregoing general descriptions and following detailed descriptions are explanatory and not intended to limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

FIG. 1 is a flow chart illustrating a cross-device information display method according to at least some embodiments.

DETAILED DESCRIPTION

Figure 2:
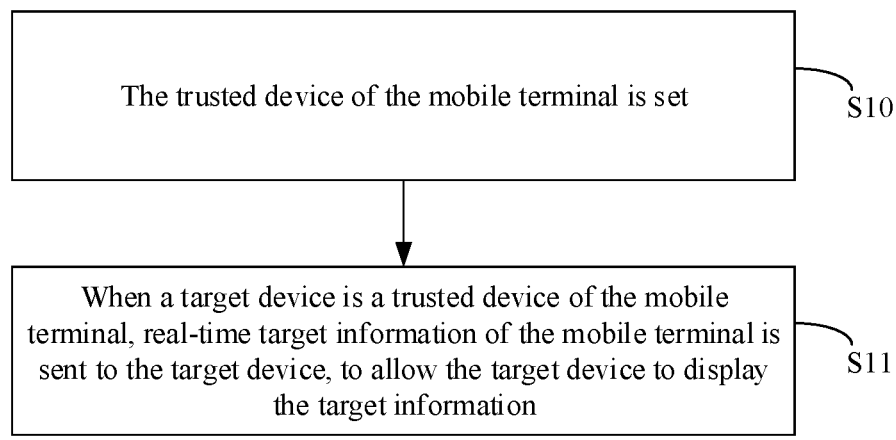
FIG. 2 is a flow chart illustrating a cross-device information display method according to at least some embodiments.

Here, embodiments are described in detail, examples of which are illustrated in the accompanying drawings. In the following description related to the accompanying drawings, the same numbers in different drawings represent the same or similar elements unless otherwise represented. The implementations described in the following embodiments do not represent all the implementations consistent with the disclosure. Instead, they are merely examples of the devices and methods consistent with some aspects of the appended claims and the disclosure.

The embodiment of the disclosure provides a cross-device information display method. The method is applied to a mobile terminal. The mobile terminal may be a computer device that may be used in the mobile terminal, including a mobile phone, a notebook and a tablet.

Referring to FIG. 1, FIG. 1 is a flow chart illustrating a cross-device information display method according to at least some embodiments. As illustrated in FIG. 1, the method may include Step S11.

In Step S11, when a target device is a trusted device of the mobile terminal, real-time target information of the mobile terminal is sent to the target device, to allow the target device to display the target information.

The target device is a device with a display screen, such as the television, the tablet and the mobile phone.

The trusted device and the trusting device are corresponding. For example, the first device is the trusted device of the second device, and the second device is the trusting device of the first device, i.e., the second device trusts the first device.

In an embodiment, when the target device is not the trusted device of the mobile terminal, the real-time target information of the mobile terminal is forbidden to be sent to the target device.

In an embodiment, when sent to the target device, the real-time target information of the mobile terminal is sent through a communication connection between the mobile terminal and the target device. For example, the communication connection is the short-distance wireless communication connection (Wireless Fidelity WiFi connection, Bluetooth connection and so on).

In an embodiment, the real-time target information of the mobile terminal is screen projection data of the mobile terminal (i.e., screen display data).

When displaying the screen projection data, the target device displays the screen projection data in a full screen, or displays the screen projection data within a preset display region.

In an embodiment, the real-time target information of the mobile terminal is information of a notification type. The information of a notification type is notification information received by the mobile terminal through a network, or notification information generated by an application of the mobile terminal of an event reminding type.

For example, the notification information received through the network is a message received by a short message application of the mobile terminal through the network. The application of an event reminding type is the calendar application, alarm clock application, and trip reminding application. The notification information generated by the calendar application is calendar event information, the notification information generated by the alarm clock application is alarm clock event information, and the notification information generated by the trip reminding application is trip event information.

In an embodiment, one or more applications in the mobile terminal are set as applications for notification synchronization. For example, as required, the short message application and the calendar application are set as the applications for notification synchronization, but the alarm clock application is not set as the application for notification synchronization. For example, the calendar application is set as the application for notification synchronization.

When displaying the information of a notification type, the target device displays the information of the notification type within a preset display region.

In the embodiment, through setting the trusted device of the mobile terminal, the mobile terminal sends the real-time target information to the trusted device of the mobile terminal, to allow the trusted device to display the target information, thereby improving the accuracy of selecting the target device for data synchronization, and avoiding a wrong selection when selecting the target device and the disturbance to a user of the wrongly selected target device.

The embodiment of the disclosure provide a cross-device information display method. The method includes the method illustrated in FIG. 1. As illustrated in FIG. 2, the method further includes Step S10 before Step S11. In S10, the trusted device of the mobile terminal is set.

In an embodiment, setting the trusted device of the mobile terminal includes: establishing a connection with the device, acquiring a unique identifier of the device through the connection, determining to set the device as the trusted device of the mobile terminal, and recording the unique identifier of the device as an identifier of the trusted device.

In an embodiment, determining to set the device as the trusted device of the mobile terminal includes: displaying a trusted device setting interface for the device, and determining to set the device as the trusted device of the mobile terminal after receiving through the trusted device setting interface a touch instruction of a control for confirmation of setting as the trusted device.

Figure 3:
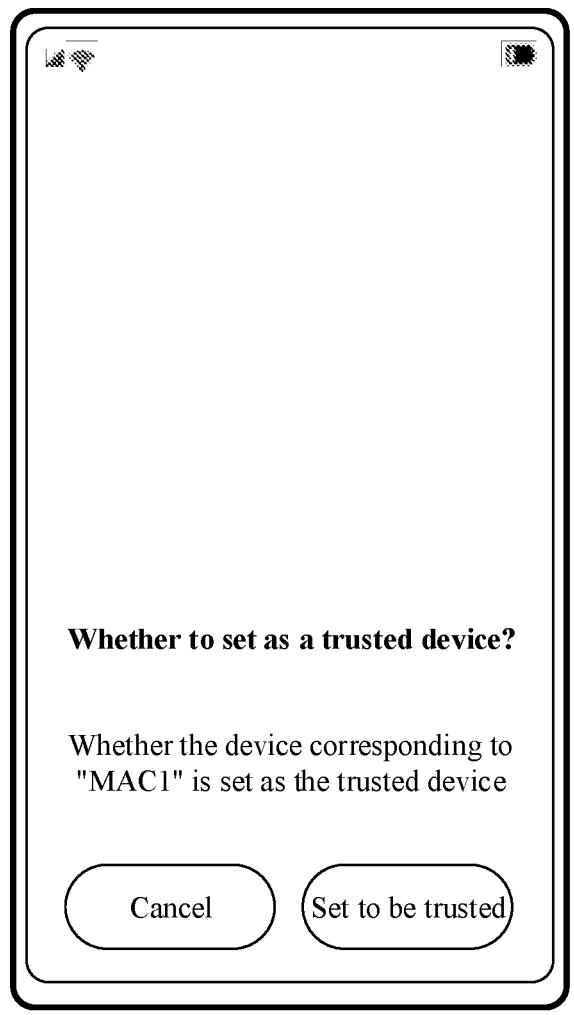
FIG. 3 is a schematic diagram of a trusted device setting interface displayed on a mobile terminal according to at least some embodiments.

For example, the mobile terminal is the mobile phone, and the target device is the television. The mobile phone establishes the WiFi connection with television 1, and acquires the identifier of television 1 through the WiFi connection. The identifier of television 1 is media access control (MAC) 1. The mobile phone displays the trusted device setting interface. As illustrated in FIG. 3, there is a "Set to be trusted" control and a "Cancel" control on the trusted device setting interface. After the user clicks the "Set to be trusted" control, the mobile phone receives an indication of setting television 1 corresponding to MAC1 as the trusted device, and records that MAC1 is the identifier of the trusted device. After the user clicks the "Cancel" control, the mobile phone receives an indication of not setting television 1 corresponding to MAC1 as the trusted device, and records that MAC1 is not the identifier of the trusted device.

In an embodiment, the mobile terminal stores a set of identifiers of the trusted device. The unique identifiers of all trusted devices of the mobile terminal are recorded in the set of identifiers. When determining whether a target device is the trusted device of the mobile terminal, the mobile terminal determines whether a unique identifier of the target device belongs to the set of identifiers of the trusted device as follows.

When the unique identifier of the target device belongs to the set of identifiers of the trusted device, it is determined that the target device is the trusted device of the mobile terminal.

When the unique identifier of the target device does not belong to the set of identifiers of the trusted device, it is determined that the target device is not the trusted device of the mobile terminal.

Figure 4:
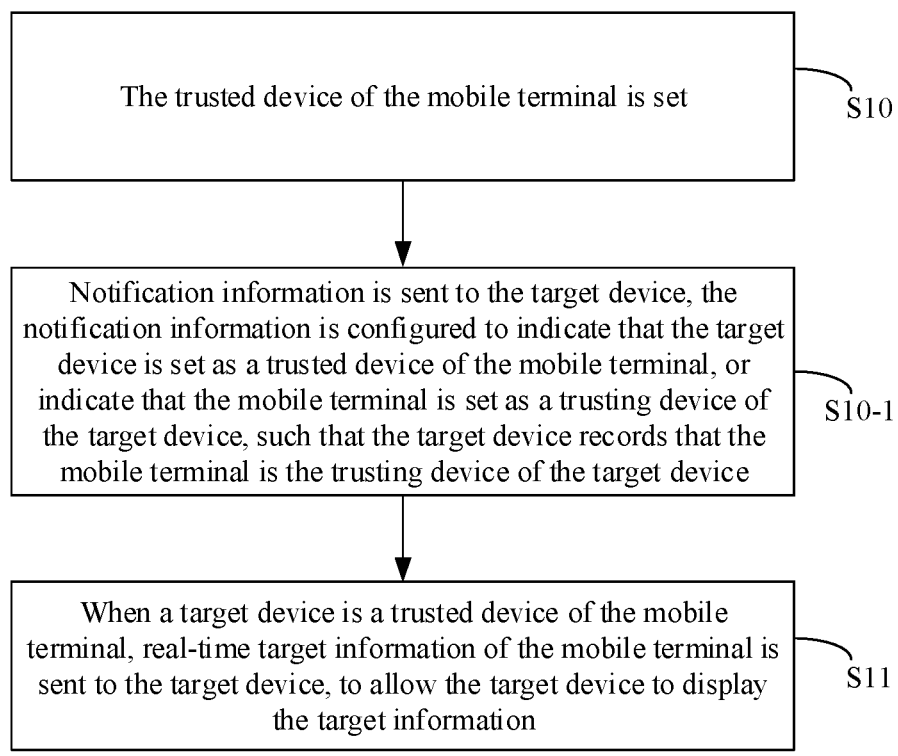
FIG. 4 is a flow chart illustrating a cross-device information display method according to at least some embodiments.

The embodiment of the disclosure provides a cross-device information display method. The method includes the method illustrated in FIG. 2, and is improved on the basis of the method illustrated in FIG. 2. As illustrated in FIG. 4, the method further includes Step S10-1 between Step S10 and Step S11. In Step S10-1, notification information is sent to the target device, and the notification information is configured to indicate that the target device is set as a trusted device of the mobile terminal, or indicate that the mobile terminal is set as a trusting device of the target device, to allow the target device to record that the mobile terminal is the trusting device of the target device.

In an embodiment, the notification message sent to the target device carries an identifier of the mobile terminal, to allow the target device to record the identifier of the mobile terminal, and records that the identifier of the mobile terminal is the identifier of the trusting device of the target device.

In the embodiment, the target device is notified of that the target device is the trusted device of the mobile terminal, or the mobile terminal is the trusting device of the target device, to allow the target device to record that the mobile terminal is the trusting device of the target device. In this way, the target device clearly distinguishes the trusted device from the untrusted device, gives a high processing priority to the trusted device, and in the black screen state, may still receive and display the target data sent from the mobile terminal, such that different usage requirements of the user can be met.

The embodiment of the disclosure provides a cross-device information display method. The method includes the method illustrated in FIG. 1; and Step S11 in which the real-time target information of the mobile terminal is sent to the target device, to allow the target device to display the target information, is implemented as follows.

When the target information is screen projection data of the mobile terminal, the real-time target information of the mobile terminal is sent to the target device, to allow the target device to display the target information in a full screen, or display the target information within a preset display region.

When the target information is information of a notification type of the mobile terminal, the real-time target information of the mobile terminal is sent to the target device, to allow the target device to display the target information in at least one of the following manners.

I. The target device displays the target information for a preset duration.

For example, the preset duration is 2 min, and upon the reception of the target information, the target device displays the target information for 2 min.

II. When the target information includes an event moment, the target device continuously displays the target information till a time reaches the event moment.

For example, the target information is the information of a notification type for reminder. The information is "Important meeting at 15:00", and the event moment in the information is 15:00. The schedule planning application in the mobile terminal generates the information at 2:30, the mobile terminal sends the information to the target device, and upon the reception of the information, the target device continuously displays the information till the event moment 15:00 in the information.

III. The target device displays the target information in a receiving sequence within a preset region of a display screen.

The preset region may be preset at different positions according to the usage requirement of the user. For example, the preset region is a region located in a right upper corner region of the screen and having a proportion of 1:5 to the screen, or the preset region is a region located in a top region of the screen and having a length same as the screen.

Figure 5:
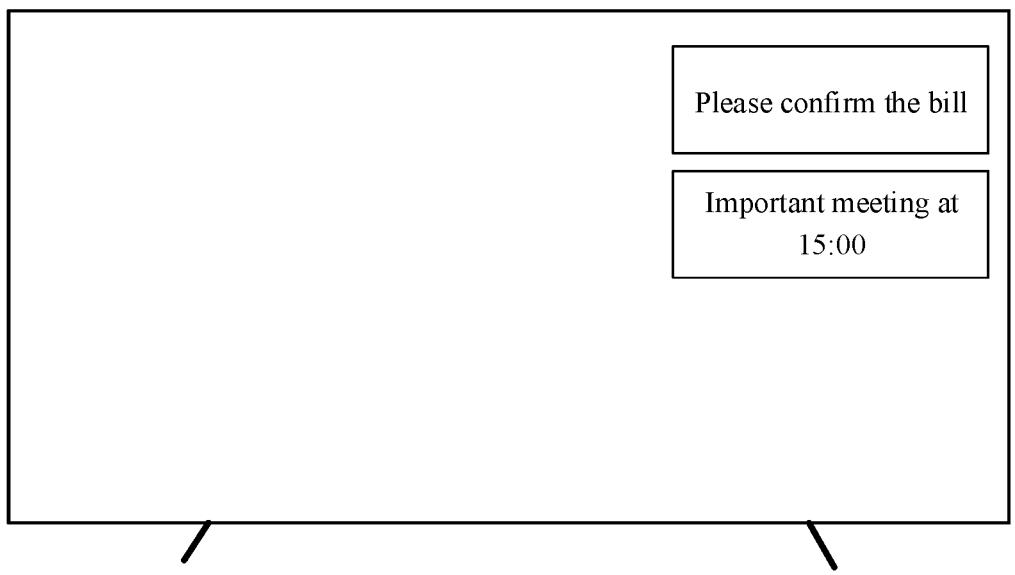
FIG. 5 is a schematic diagram of displaying target data on a display device according to at least some embodiments.

For example, as illustrated in FIG. 5, the preset region is a region at the right upper corner of the display screen of the target device. The information located above and displayed as "Please confirm the bill" is the first piece of received information, and the information located below and displayed as "Important meeting at 15:00" is the second piece of received information. The two pieces of information are sequentially displayed according to a receiving sequence.

IV. The target device displays the target information in a scrolling mode within the preset region of the display screen.

Figure 6:
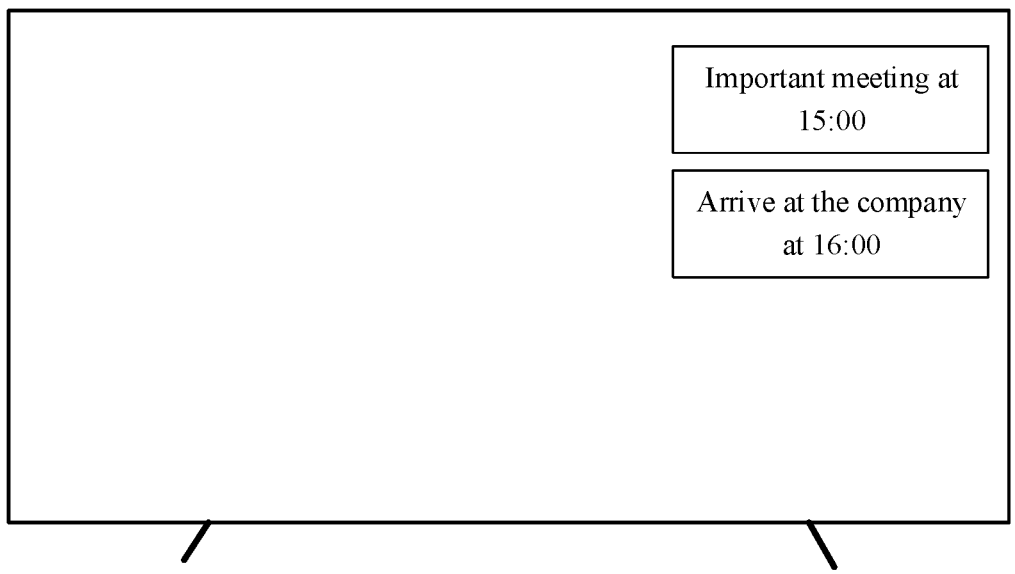
FIG. 6 is a schematic diagram of displaying target data on a display device according to at least some embodiments.

For example, as illustrated in FIG. 5, the preset region is the region at the right upper corner of the display screen of the target device. The information located above and displayed as "Please confirm the bill" is the first piece of received information, and the information located below and displayed as "Important meeting at 15:00" is the second piece of received information. The two pieces of information are sequentially displayed according to a receiving sequence. At this moment, new information "Arrive at the company at 16:00" is received. Due to the limited area of the preset region, the three pieces of information cannot be displayed at the same time, and thus are displayed in a scrolling mode. FIG. 6 shows a display state in the scrolling display process.

In the foregoing four manners, each adjustable parameter may be set as different values by the mobile terminal according to the usage requirement, and the setting result is sent to the target device. For example, the preset duration in the first manner is set as 2 min, 1 min or 5 min or the like according to the usage requirement, and the preset region in the third manner is set as the region of the preset size at the right upper corner, or the region of the preset size at the right lower corner according to the usage requirement.

In an embodiment, when displaying the target information, the target device displays the target information in a preset rendering manner. For example, the rendering manner may include one of the following: displaying at a preset color, displaying at a preset font format, and displaying at a preset font size.

In the embodiment, the notification of the mobile terminal is displayed on the display device to implement the cross-device information synchronization, such that the display efficiency of the notification is improved. For example, when the display device is the television, with the display area and more audiences of the display device, better broadcast effect is achieved for the notification.

The embodiment of the disclosure provides a cross-device information display method. The method includes the method illustrated in FIG. 1, and step S11 further includes: sending, when the target information is information of a notification type, a name of an application to which the target information belongs to the target device, to allow the target device to display the name of the application to which the target information belongs.

Figure 7:
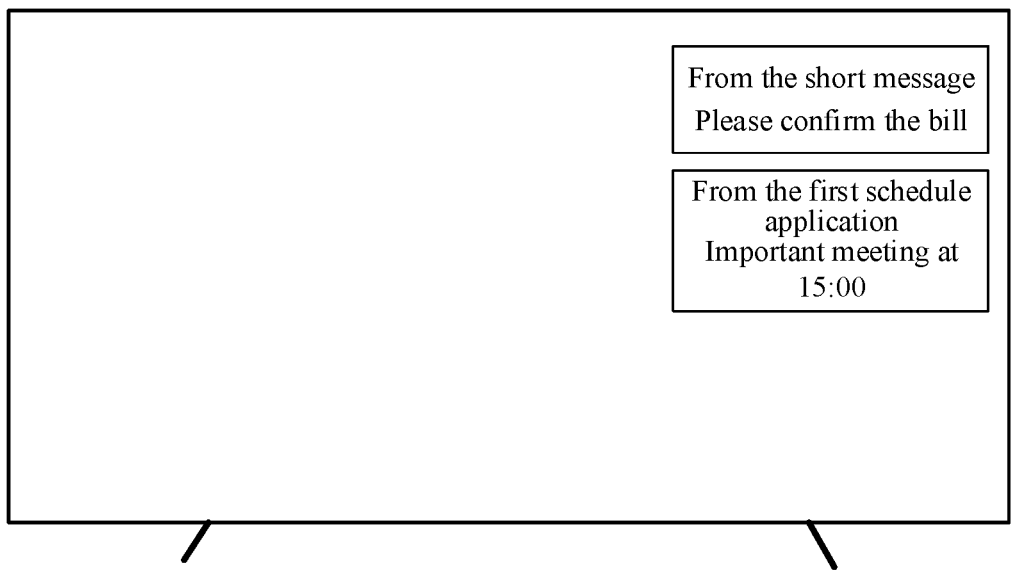
FIG. 7 is a schematic diagram of displaying target data on a display device according to at least some embodiments.

For example, as illustrated in FIG. 7, besides the contents of the target information, the name of the application to which each piece of information belongs is further displayed compared with FIG. 5. For example, the application to which the first piece of information belongs is the short message application, so "From the short message" is displayed in FIG. 7; and the application to which the second piece of information belongs is the first schedule application, so "From the first schedule application" is displayed in FIG. 7.

In the embodiment, when the contents of the notification information are displayed on the target device, the name of the application to which the notification information belongs is displayed simultaneously, such that the user may know the source of the notification information more clearly, and use more dimensions for obtaining the notification information.

The display device may be in a black screen state, which is a common state of the device. The device in the black screen state refers to the device in a dormant state, a backlight off state or the like in a case where the device is powered on. The device cannot establish the communication connection with other devices when in the black screen state. For example, when both the mobile phone and the television support the WiFi function, the mobile phone and the television are located in the same WiFi network. The mobile phone transmits a finding broadcast signal; and upon the reception of the finding broadcast signal, the television makes a response to the broadcast signal. The mobile phone successfully finds the television. When the mobile phone initiates a request for establishing a WiFi connection with the television, the television ignores the WiFi connection request because the television is in the black screen state, and thus the mobile phone cannot establish the WiFi connection with the television in the black screen state.

Figure 8:
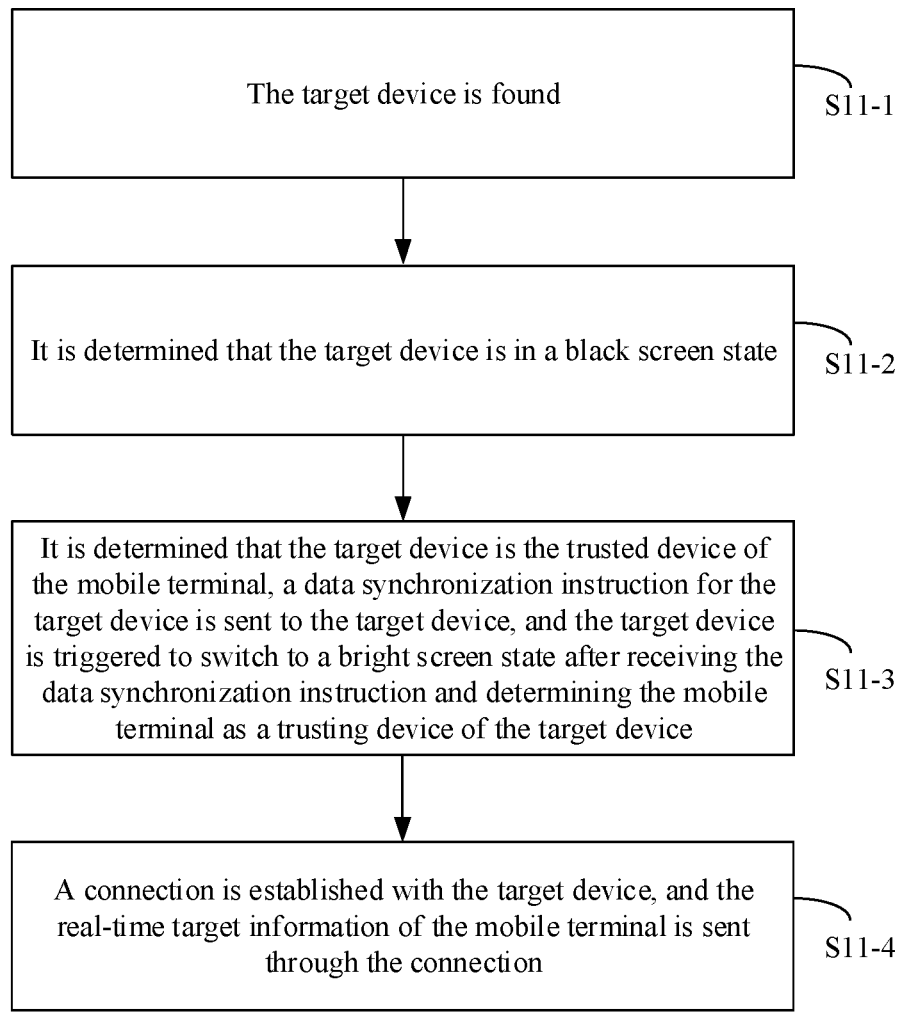
FIG. 8 is a flow chart of a cross-device information display method according to at least some embodiments.

The embodiment of the disclosure provides a cross-device information display method. The method includes the method illustrated in FIG. 1. As illustrated in FIG. 8, Step S11 in which the real-time target information of the mobile terminal is sent to the target device includes Step S11-1 to Step S11-4.

In Step S11-1, the target device is found.

In Step S11-1, the finding process includes the following actions: the mobile terminal transmits a finding broadcast signal frame, and upon the reception of a response signal frame for the finding broadcast signal, determines that a device sending the response signal frame is the found target device.

In Step S11-2, it is determined that the target device is in a black screen state.

In Step S11-3, it is determined that the target device is the trusted device of the mobile terminal, a data synchronization instruction for the target device is sent to the target device, and the target device is triggered to switch to a bright screen state after receiving the data synchronization instruction and determining that the mobile terminal is a trusting device of the target device.

In step S1103, when the target device is not the trusted device of the mobile terminal, the target device determines, after receiving the data synchronization instruction, that the mobile terminal is not the trusting device of the target device, and continuously maintains the black screen state.

In Step S11-4, a connection is established with the target device, and the real-time target information of the mobile terminal is sent through the connection.

In an embodiment, a first dedicated identifier for representing a screen projection instruction and a second dedicated identifier for representing a display notification instruction are provided, such that the target device may identify whether the screen projection instruction or the display notification instruction is received.

The real-time target information of the mobile terminal is screen projection data of the mobile terminal, and the data synchronization instruction in Step S11-3 is a screen projection instruction and is expressed as the first dedicated identifier.

The real-time target information of the mobile terminal is the information of a notification type. The information of a notification type is notification information received by the mobile terminal through a network, or notification information generated by an application of the mobile terminal of an event reminding type. The data synchronization instruction in Step S11-3 is a display notification instruction and is expressed as the second dedicated identifier.

In the embodiment, under the premise of setting the trusted device, the target device as the trusted device in the black screen state may still respond to the target information sent from the mobile terminal, thereby implementing synchronization with the target information of the mobile terminal without using a remote controller additionally to control the television to exit the black screen state and enter the bright screen state, such that the convenience of the information synchronization for the trusted device is improved. When the target device is not the trusted device of the mobile terminal, the target device cannot complete the information synchronization in the black screen state, thereby avoiding a wrong selection when selecting the target device and avoiding the disturbance to the user of the wrongly selected target device.

The embodiment of the disclosure provides a cross-device information display method. The method is applied to a display equipment. The display equipment is a television, a mobile phone, a tablet and so on.

Figure 9:
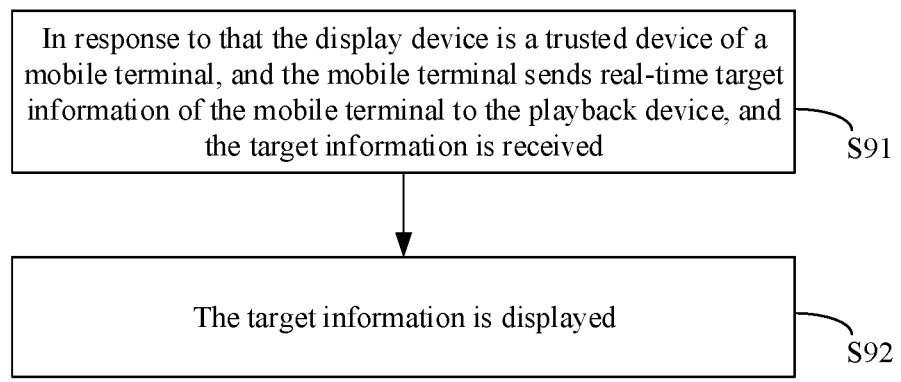
FIG. 9 is a flow chart of a cross-device information display method according to at least some embodiments.

Referring to FIG. 9, FIG. 9 is a flow chart of a cross-device information display method according to at least some embodiments. As illustrated in FIG. 9, the method includes Step S91 and Step S92.

In Step S91, in response to that the display device is a trusted device of a mobile terminal, and the mobile terminal sends real-time target information of the mobile terminal to the display device, the target information is received.

In Step S92, the target information is displayed.

In the embodiment, through setting on the mobile terminal the trusted device of the mobile terminal, the mobile terminal sends the real-time target information to the trusted device of the mobile terminal, to allow the trusted device to display the target information, thereby improving the accuracy of selecting the target device for data synchronization, avoiding a wrong selection when selecting the target device, and avoiding the disturbance to a user of the wrongly selected target device.

Figure 10:
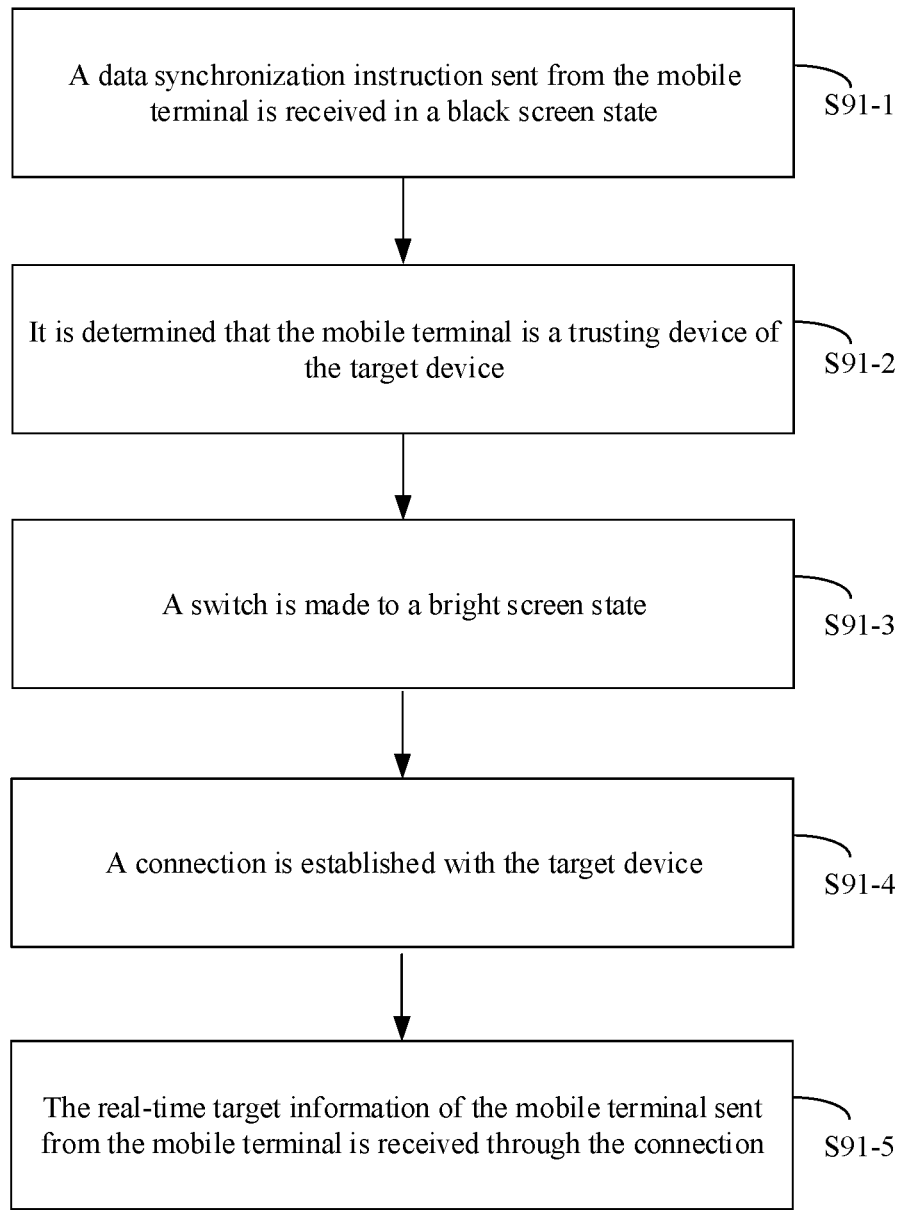
FIG. 10 is a flow chart of a cross-device information display method according to at least some embodiments.

The embodiment of the disclosure provides a cross-device information display method. The method includes the method illustrated in FIG. 9. As illustrated in FIG. 10, Step S91 includes Step S91-1 to Step S91-5.

In Step S91-1, a data synchronization instruction sent from the mobile terminal is received in a black screen state.

In Step S91-2, it is determined that the mobile terminal is a trusting device of the target device.

In Step S91-3, a switch is made to a bright screen state.

In Step S91-4, a connection is established with the target device.

In Step S91-5, the real-time target information of the mobile terminal that is sent from the mobile terminal is received through the connection.

In an embodiment, when it is determined that the mobile terminal is not the trusting device of the target device in step S91-2, the mobile terminal continuously maintains the black screen state, and cannot establish the connection with the target device.

In an embodiment, the notification message sent to the target device carries an identifier of the mobile terminal, such that the target device records the identifier of the mobile terminal, and records that the identifier of the mobile terminal is an identifier of the trusted device.

In the embodiment, under the premise of setting the trusted device, the target device as the trusted device in the black screen state may still achieve the information synchronization from the mobile terminal without using a remote controller additionally to control the television to exit the black screen state and enter the bright screen state, such that the convenience of the information synchronization for the trusted device is improved. When the target device is not the trusted device of the mobile terminal, the target device cannot achieve the information synchronization in the black screen state, thereby avoiding a wrong selection when selecting the target device, and avoiding the disturbance to the user of the wrongly selected target device.

The embodiment of the disclosure provides a cross-device information display method. The method includes the method illustrated in FIG. 9, and further includes step S91-0 before step S91-1. In step S91-0, notification information sent from the mobile terminal is received during the previous connection with the mobile terminal, the notification information is configured to indicate that the display device is set as a trusted device of the mobile terminal, or indicate that the mobile terminal is set as a trusting device of the display device, and it is recorded that the mobile terminal is the trusting device of the target device.

In an embodiment, an identifier of the mobile terminal is parsed from the notification information, and the identifier of the mobile terminal is recorded as an identifier of the trusted device.

The embodiment of the disclosure provides a cross-device information display method. The method includes the method illustrated in FIG. 9. In step S92, when the target information is the information of a notification type of the mobile terminal, the target information is displayed in at least one of the following manners.

I. The target information is displayed for a preset duration.

For example, the preset duration is 2 min, and upon the reception of the target information, the target device displays the target information for 2 min.

II. When the target information includes an event moment, the target information is continuously displayed till the time reaches the event moment.

For example, the target information is the information of a notification type for reminder. The information is "Important meeting at 15:00", and the event moment in the information is 15:00. The schedule planning application in the mobile terminal generates the information at 2:30, the mobile terminal sends the information to the target device, and upon the reception of the information, the target device continuously displays the information till the event moment 15:00 in the information.

III. The target information is displayed in a receiving sequence within a preset region of a display screen.

The preset region may be preset differently at different positions according to the usage requirement of the user. For example, the preset region is a region located in a right upper corner region of the screen and having a proportion of 1:5 to the screen, or the preset region is a region located in a top region of the screen and having a length same as the screen.

For example, as illustrated in FIG. 5, the preset region is a region at the right upper corner of the display screen of the target device. The information located above and displayed as "Please confirm the bill" is the first piece of received information, and the information located below and displayed as "Important meeting at 15:00" is the second piece of received information. The two pieces of information are sequentially displayed according to a receiving sequence.

IV. The target information is displayed in a scrolling mode within the preset region of the display screen.

For example, as illustrated in FIG. 5, the preset region is the region at the right upper corner of the display screen of the target device. The information located above and displayed as "Please confirm the bill" is the first piece of received information, and the information located below and displayed as "Important meeting at 15:00" is the second piece of received information. The two pieces of information are sequentially displayed according to a receiving sequence. At this moment, new information "Arrive at the company at 16:00" is received. Due to the limited area of the preset region, the three pieces of information cannot be displayed at the same time, and thus are displayed in a scrolling mode. FIG. 6 shows a display state in the scrolling display process.

In an embodiment, when displaying the target information, the target device displays the target information in a preset rendering manner. For example, the rendering manner may include one of the following: displaying at a preset color, displaying at a preset font format, and displaying at a preset font size.

In the embodiment, the notification of the mobile terminal is displayed on the display device to implement the cross-device information synchronization, such that the display efficiency of the notification is improved. For example, when the display device is the television, with the display area and more audiences of the display device, the notification achieves the better broadcast effect.

The embodiment of the disclosure provides a cross-device information display method. The method includes the method illustrated in FIG. 9. Step S91 further includes: receiving a name of an application to which the target information sent from the mobile terminal belongs.

Step S92 further includes: displaying the name of the application to which the target information belongs.

In an embodiment, the target information and the name of the application to which the target information belongs are displayed within the same display region.

For example, as illustrated in FIG. 7, compared with FIG. 5, besides the contents of the target information, the name of the application to which each piece of information belongs is further displayed. For example, the application to which the first piece of information belongs is the short message application, so "From the short message" is displayed in FIG. 7; and the application to which the second piece of information belongs is the first schedule application, so "From the first schedule application" is displayed in FIG. 7.

In the embodiment, when the contents of the notification information are displayed on the target device, the name of the application to which the notification information belongs is displayed simultaneously, such that the user may know the source of the notification information more clearly, and use more dimensions for obtaining the notification information.

The disclosure is described below with the embodiments.

The First Embodiment

The mobile phone establishes the WiFi connection with the first television, and acquires the unique identifier MAC1 of the first television.

The user opens a device configuration page, clicks a control for setting the function of the trusted device, and opens a trusting device configuration page. The trusting device configuration page displays prompt information. The prompt information includes the unique identifier MAC1 of the first television. As illustrated in FIG. 3, the user clicks the "Set to be trusted" control, such that the first television is set as the trusted device. MAC1 is recorded, and the unique identifier of the first television is recorded as the unique identifier of the trusted device.

The mobile phone sends notification information to the first television to indicate that the first television is set as the trusted device. The notification information carries the identifier of the mobile phone. Upon the reception of the notification information, the first television stores the identifier of the mobile phone and records the identifier as the identifier of the trusting device.

The WiFi connection function is turned off on the mobile phone, and the first television is switched to the black screen state.

After a period of time, the WiFi connection function is turned on on the mobile phone, and the mobile phone searches a device capable of establishing the WiFi connection to obtain a finding result. The finding result includes the name of the first television and MAC1.

Through clicking the "Screen projection" control on the control interface of the mobile phone, the screen projection command is sent to the first television. The screen projection command includes the identifier of the mobile phone. Upon the reception of the screen projection command, the first television determines whether the identifier of the mobile terminal carried in the screen projection command is the stored identifier of the trusted device, and switches to the bright screen state when the identifier of the mobile terminal carried in the screen projection command is the stored identifier of the trusted device.

After switching to the bright screen state, the first television establishes the WiFi connection with the mobile phone. The mobile phone sends the screen projection data to the first television through the connection. Upon the reception of the screen projection data, the first television displays the screen projection data on the full screen, thereby implementing synchronous display between the mobile phone and the first television.

The Second Embodiment

The mobile phone establishes the WiFi connection with the second television, and acquires the unique identifier MAC2 of the second television.

The user opens a device configuration page, clicks a control for setting the function of the trusted device, and opens a trusting device configuration page. The trusting device configuration page displays prompt information. The prompt information includes the unique identifier MAC2 of the second television. The user clicks the "Set to be trusted" control, such that the second television is set as the trusted device. MAC2 is recorded, and the unique identifier of the second television is recorded as the unique identifier of the trusted device.

The mobile phone sends notification information to the second television to indicate that the second television is set as the trusted device. The notification information carries the identifier of the mobile phone. Upon the reception of the notification information, the second television stores the identifier of the mobile phone and records the identifier as the identifier of the trusted device.

The second television is in a turned-on state, and plays television programs in real time.

The user clicks the "Notification synchronization" control on the control interface of the mobile phone, such that a notification synchronization indication is sent to the second television. The notification synchronization indication includes the identifier of the mobile phone. Upon the reception of the notification synchronization indication, the second television determines whether the identifier of the mobile terminal carried in the notification synchronization indication is the stored identifier of the trusting device, and returns a response message for the notification synchronization indication to the mobile phone when the identifier of the mobile terminal carried in the notification synchronization indication is the stored identifier of the trusted device.

When the first schedule application in the mobile phone sends first reminding information, the mobile phone sends the first reminding information to the second television; upon the reception of the first reminding information, the second television displays the first reminding information at the right upper corner of the display screen. The television is used as a home appliance center, such that one or more users may see the notification information on the mobile phone when watching the television.

Figure 11:
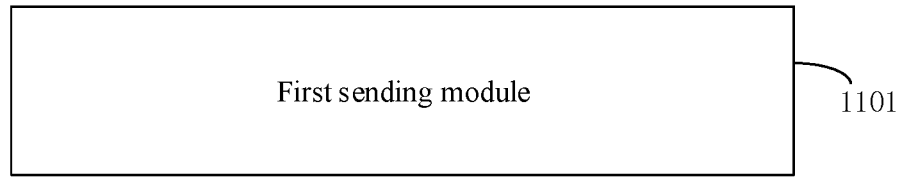
FIG. 11 is a structural diagram of a cross-device information display device according to at least some embodiments.

The embodiment of the disclosure provides a cross-device information display device. The device is applied to a mobile terminal. The device includes the equipment illustrated in FIG. 11. The device includes a first sending module 1101.

The first sending module 1101 is configured to send, when a target device is a trusted device of the mobile terminal, real-time target information of the mobile terminal to the target device, to allow the target device to display the target information.

In an embodiment, the first sending module is further configured to send, when the target information is information of a notification type, a name of an application to which the target information belongs to the target device, to allow the target device to display the name of the application to which the target information belongs.

Figure 12:
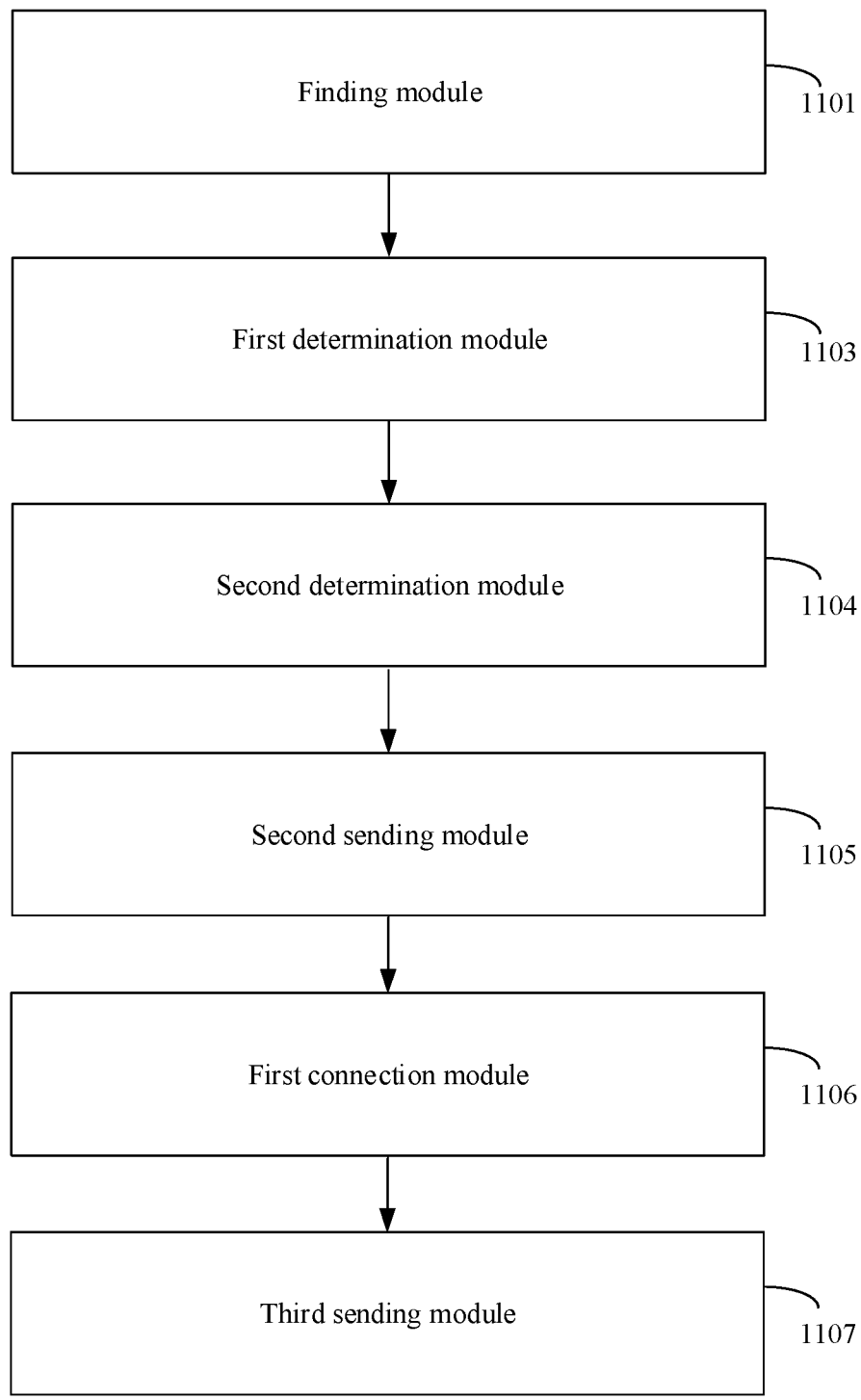
FIG. 12 is a flow chart of a cross-device information display method according to at least some embodiments.

The embodiment of the disclosure provides a cross-device information display device. The device is applied to a mobile terminal. The device includes the equipment illustrated in FIG. 11. As illustrated in FIG. 12, the first sending module in the device includes: a finding module 1102, a first determination module 1103, a second determination module 1104, a second sending module 1105, a first connection module 1106 and a third sending module 1107.

The finding module 1102 is configured to find the target device.

The first determination module 1103 is configured to determine that the target device is in a black screen state.

The second determination module 1104 is configured to determine the target device as the trusted device of the mobile terminal.

The second sending module 1105 is configured to send a data synchronization instruction for the target device to the target device, and trigger the target device to determine the mobile terminal as a trusting device of the target device and to switch to a bright screen state after receiving the data synchronization instruction.

The first connection module 1106 is configured to establish a connection with the target device.

The third sending module 1107 is configured to send the real-time target information of the mobile terminal through the connection.

In an embodiment, the real-time target information of the mobile terminal is screen projection data of the mobile terminal, and the data synchronization instruction is a screen projection instruction; or the real-time target information of the mobile terminal is information of a notification type, and the data synchronization instruction is a display notification instruction.

Figure 13:
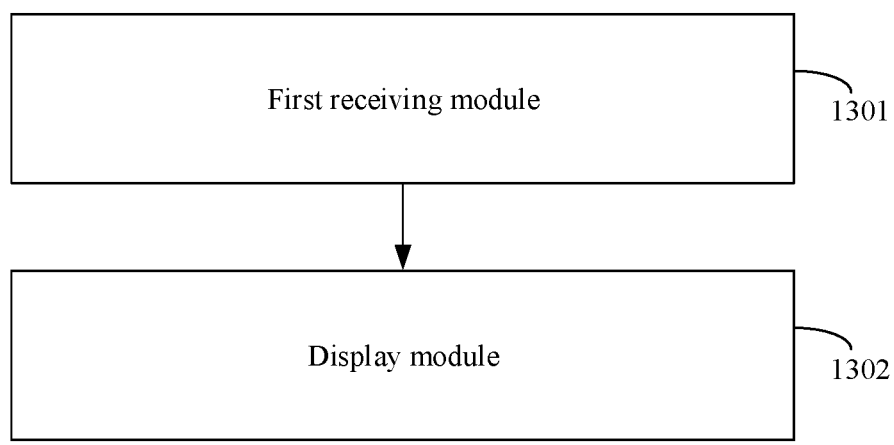
FIG. 13 is a flow chart of a cross-device information display method according to at least some embodiments.

The embodiment of the disclosure provides a cross-device information display device. The device is applied to a display equipment. The device includes the device illustrated in FIG. 13. The device may include: a first receiving module 1301, and a display module 1302.

The first receiving module 1301 is configured to receive the target information, in response to that the display device is a trusted device of a mobile terminal, and the mobile terminal sends real-time target information of the mobile terminal to the display device.

The display module 1302 is configured to display the target information.

In an embodiment, the first receiving module is further configured to receive a name of an application to which the target information sent from the mobile terminal belongs.

The display module 1302 is further configured to display the name of the application to which the target information belongs.

Figure 14:
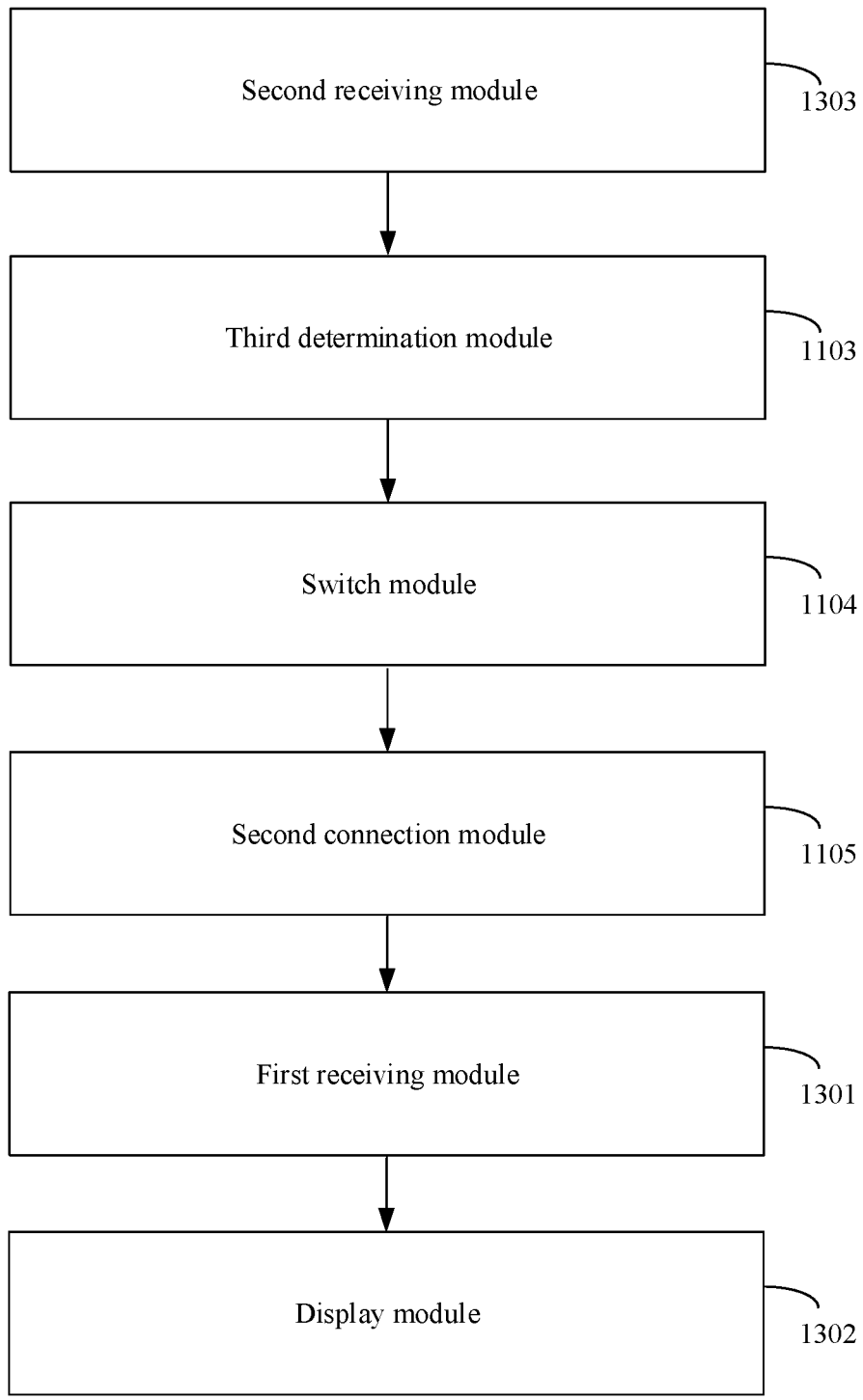
FIG. 14 is a structural diagram of a cross-device information display device according to at least some embodiments.

The embodiment of the disclosure provides a cross-device information display device. The device is applied to a display equipment. The device includes the device illustrated in FIG. 13. As illustrated in FIG. 14, the device includes: a second receiving module 1303, a third determination module 1304, a switch module 1305 and a second connection module 1306.

The second receiving module 1303 is configured to receive a data synchronization instruction sent from the mobile terminal.

The third determination module 1304 is configured to determine that the mobile terminal is a trusting device of the target device.

The switch module 1305 is configured to switch to a bright screen state.

The second connection module 1306 is configured to establish a connection with the target device.

The first receiving module 1301 is further configured to receive, through the connection, the real-time target information of the mobile terminal sent from the mobile terminal.

In an embodiment, the real-time target information of the mobile terminal is screen projection data of the mobile terminal, and the data synchronization instruction is a screen projection instruction; or the real-time target information of the mobile terminal is information of a notification type, and the data synchronization instruction is a display notification instruction.

In an embodiment, the display module 1302 is further configured to display the target information in at least one of the following manners when the target information is information of a notification type of the mobile terminal:

displaying the target information for a preset duration;

continuously displaying, when the target information includes an event moment, the target information till the time reaches the event moment;

displaying the target information in a receiving sequence within a preset region of a display screen; and displaying the target information in a scrolling mode within the preset region of the display screen.

The technical solutions provided in the embodiments of the disclosure may achieve the following beneficial effects: through setting the trusted device of the mobile terminal, the mobile terminal sends the real-time target information to the trusted device of the mobile terminal, to allow the trusted device to display the target information, thereby improving the accuracy of selecting the target device for data synchronization, and avoiding a wrong selection when selecting the target device and the disturbance to the user of the wrongly selected target device.

Figure 15:
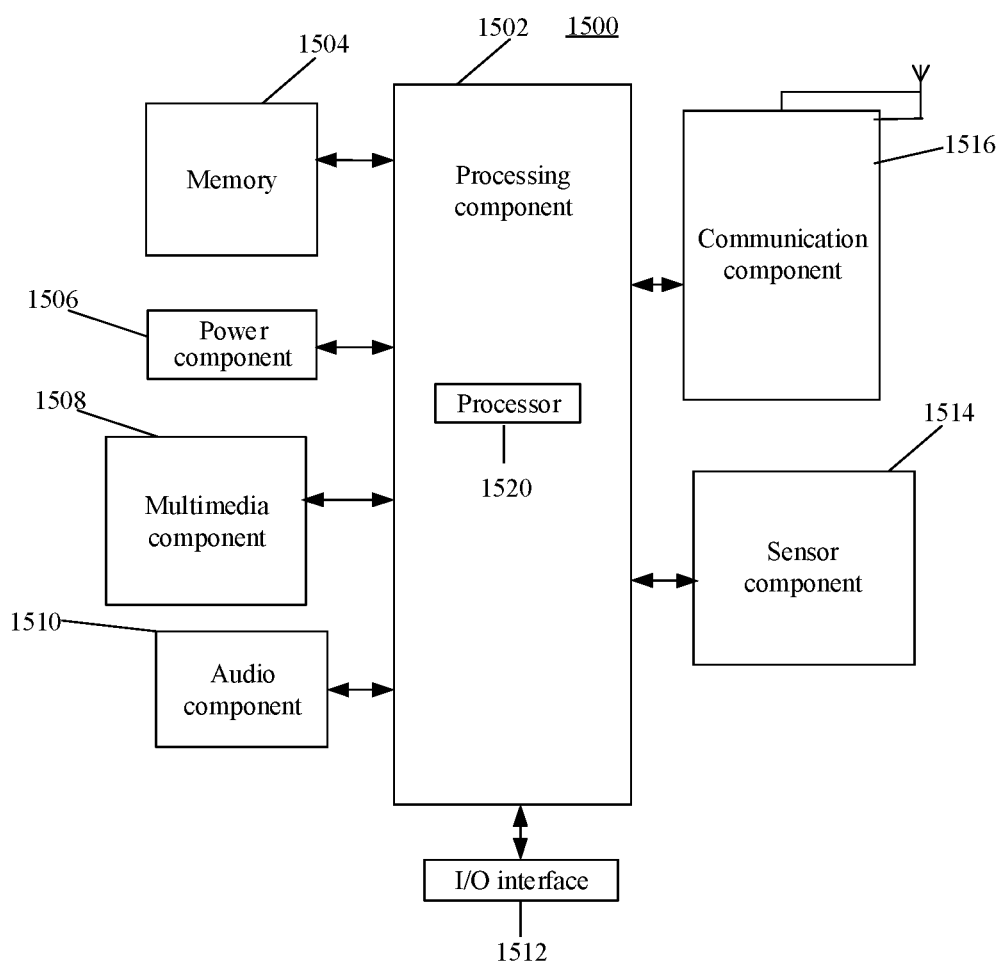
FIG. 15 is a structural diagram of a cross-device information display device according to at least some embodiments.

FIG. 15 is a structural diagram of a cross-device information display device 1500 according to at least some embodiments. For example, the device 1500 may be a mobile phone, a computer, a digital broadcast terminal, a messaging device, a game console, a tablet, a medical device, an exercise equipment, a personal digital assistant (PDA), or the like.

Referring to FIG. 15, the device 1500 may include one or more of the following components: a processing component 1502, a memory 1504, a power component 1506, a multimedia component 1508, an audio component 1510, an input/output (I/O) interface 1512, a sensor component 1514, and a communication component 1516.

The processing component 1502 typically controls the overall operations of the device 1500, such as the operations associated with display, telephone calls, data communications, camera operations, and recording operations. The processing component 1502 may include one or more processors 1520 to execute instructions, so as to perform all or part of the steps of the above described methods. Moreover, the processing component 1502 may include one or more modules which facilitate the interaction between the processing component 1502 and other components. For instance, the processing component 1502 may include a multimedia module to facilitate the interaction between the multimedia component 1508 and the processing component 1502.

The memory 1504 is configured to store various types of data to support the operation of the device 1500. Examples of such data include instructions for any applications or methods operated on the device 1500, contact data, phonebook data, messages, pictures, videos, etc. The memory 1504 may be implemented with any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1506 provides power to various components of the device 1500. The power component 1506 may include a power management system, one or more power sources, and any other components associated with the generation, management, and distribution of power in the device 1500.

The multimedia component 1508 includes a screen providing an output interface between the device 1500 and the user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, slides and gestures on the TP. The touch sensors may not only sense a boundary of a touch or a slide, but also sense a period of time and a pressure associated with the touch or slide. In some embodiments, the multimedia component 1508 includes a front camera and/or a rear camera. The front camera and/or the rear camera may receive external multimedia data when the device 1500 is in an operation mode, such as a shooting mode or a video mode. Each of the front camera and the rear camera may be a fixed optical lens system or have a focus and an optical zoom capability.

The audio component 1510 is configured to output and/or input audio signals. For example, the audio component 1510 includes a microphone (MIC) configured to receive an external audio signal when the device 1500 is in an operation mode, such as a call mode, a recording mode, and a voice recognition mode. The received audio signal may further be stored in the memory 1504 or transmitted via the communication component 1516. In some embodiments, the audio component 1510 further includes a speaker configured to output audio signals.

The I/O interface 1512 provides an interface between the processing component 1502 and peripheral interface modules. The peripheral interface modules may be a keyboard, a click wheel, buttons, or the like. The buttons may include, but are not limited to, a home button, a volume button, a start button, and a lock button.

The sensor component 1514 includes one or more sensors to provide state assessments of various aspects of the device 1500. For instance, the sensor component 1514 may detect an on/off state of the device 1500 and relative positioning of components, such as a display and a small keyboard of the device 1500, and the sensor component 1514 may further detect a change in a position of the device 1500 or a position of a component of the device 1500, presence or absence of contact between the user and the device 1500, orientation or acceleration/deceleration of the device 1500 and a change in temperature of the device 1500. The sensor component 1514 may include a proximity sensor, configured to detect the presence of nearby objects without any physical contact. The sensor component 1514 may further include a light sensor, such as a complementary metal oxide semiconductor (CMOS) or charge coupled device (CCD) image sensor, configured for use in an imaging application. In some embodiments, the sensor component 1514 may further include an accelerometer sensor, a gyroscope sensor, a magnetic sensor, a pressure sensor, or a temperature sensor.

The communication component 1516 is configured to facilitate wired or wireless communications between the device 1500 and other devices. The device 1500 may access a communication standard based wireless network, such as a wireless fidelity (WiFi) network, a 2G or 3G network or a combination thereof. In at least some embodiments, the communication component 1516 receives a broadcast signal or broadcast associated information from an external broadcast management system via a broadcast channel. In at least some embodiments, the communication component 1516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In at least some embodiments, the device 1500 may be implemented with one or more application specific integrated circuit (ASIC), digital signal processor (DSP), digital signal processing device (DSPD), programmable logic device (PLD), field programmable gate array (FPGA), controller, micro-controller, microprocessor, or other electronic components, for performing the above described methods.

In at least some embodiments, a non-transitory computer readable storage medium including an instruction is further provided, for example, the memory 1504 including the instruction. The instruction may be executed by the processing component 1520 of the device 1500 to achieve the above methods. For example, the non-transitory computer-readable storage medium may be a read only memory (ROM), a random access memory (RAM), a compact disc read-only memory (CD-ROM), a magnetic tape, a floppy disc, an optical data storage device or the like.

Regarding the device in the above embodiments, how each module preforms the operations specifically has been described in detail in the embodiments related to the methods, and is not elaborated herein.

Other embodiments of the disclosure are apparent to those skilled in the art in consideration of the specification together with the practice of the disclosure here. The disclosure is intended to cover any variations, usages, or adaptations of the disclosure following the general principles thereof and including common knowledge in the art or common technical measures in the art which are undisclosed in the disclosure. It is intended that the specification and embodiments are explanatory, and the true scope and spirit of the disclosure is indicated by the following claims.

It is to be understood that the disclosure is not limited to the exact structure described above and illustrated in the accompanying drawings, and various modifications and changes may be made without departing from the scope thereof. It is intended that the scope of the disclosure only be limited by the appended claims.

What is claimed is:

1. A method for cross-device information display, comprising:
   in response to determining that a target device is a trusted device of a mobile terminal, sending, by the mobile terminal, real-time target information of the mobile terminal to the target device to allow the target device to display the target information;
   wherein sending the real-time target information of the mobile terminal to the target device comprises:
   finding the target device;
   determining that the target device is in a black screen state;
   determining that the target device is the trusted device of the mobile terminal, sending to the target device a data synchronization instruction for the target device, and triggering the target device to determine the mobile terminal as a trusting device of the target device and to switch to a bright screen state after receiving the data synchronization instruction; and
   establishing a connection with the target device, and sending the real-time target information of the mobile terminal through the connection.

2. The method of claim 1, further comprising:
   sending, in response to determining that the target information is information of a notification type, a name of an application to which the target information belongs to the target device to allow the target device to display the name of the application to which the target information belongs.

3. The method of claim 1, wherein sending the real-time target information of the mobile terminal to the target device to allow the target device to display the target information comprises:
   sending the real-time target information of the mobile terminal to the target device to allow the target device to display the target information in at least one of following manners:
   displaying the target information for a preset duration;
   continuously displaying, in response to determining that the target information comprises an event moment, the target information till time reaches the event moment;
   displaying the target information at a receiving sequence within a preset region of a display screen; or
   displaying the target information in a scrolling mode within the preset region of the display screen.

4. The method of claim 1, wherein the real-time target information of the mobile terminal comprises screen projection data of the mobile terminal, and the data synchronization instruction is a screen projection instruction.

5. The method of claim 1, wherein the real-time target information of the mobile terminal comprises information of a notification type, and the data synchronization instruction is a display notification instruction.

6. A device for cross-device information display, comprising:
   a processor; and
   a memory configured to store instructions executable by the processor;
   wherein the processor is configured to execute the instructions to:
   in response to determining that a target device is a trusted device of a mobile terminal, send, real-time target information of the mobile terminal to the target device to allow the target device to display the target information;

wherein the processor is further configured to execute the instructions to:

find the target device;

determine that the target device is in a black screen state;

determine the target device as the trusted device of the mobile terminal;

send to the target device a data synchronization instruction for the target device, and trigger the target device to determine the mobile terminal as a trusting device of the target device and to switch to a bright screen state after receiving the data synchronization instruction;

establish a connection with the target device, and send the real-time target information of the mobile terminal through the connection.

7. The device of claim 6, wherein the processor is further configured to execute the instructions to:

send, in response to determining that the target information is information of a notification type, a name of an application to which the target information belongs to the target device to allow the target device to display the name of the application to which the target information belongs.

8. The device of claim 6, wherein the real-time target information of the mobile terminal comprises screen projection data of the mobile terminal, and the data synchronization instruction is a screen projection instruction.

9. The device of claim 6, wherein the real-time target information of the mobile terminal comprises information of a notification type, and the data synchronization instruction is a display notification instruction.

10. A device for cross-device information display, comprising:

a processor; and a memory configured to store instructions executable by the processor;

wherein the processor is configured to execute the instructions to:

receive target information in response to determining that the device is a trusted device of a mobile terminal and the mobile terminal sends real-time target information of the mobile terminal to the device; and display the target information;

wherein the processor is further configured to execute the instructions to:

receive a data synchronization instruction sent from the mobile terminal;

determine the mobile terminal as a trusting device of the target device;

switch to a bright screen state;

establish a connection with the target device; and receive, through the connection, the real-time target information of the mobile terminal sent from the mobile terminal.

11. The device of claim 10, wherein the processor is further configured to execute the instructions to:

receive a name of an application to which the target information sent from the mobile terminal belongs; and display the name of the application to which the target information belongs.

12. The device of claim 10, wherein the real-time target information of the mobile terminal comprises screen projection data of the mobile terminal, and the data synchronization instruction is a screen projection instruction.

13. The device of claim 10, wherein the real-time target information of the mobile terminal comprises information of a notification type, and the data synchronization instruction is a display notification instruction.

14. The device of claim 10, wherein the processor is further configured to execute the instructions to:

in response to determining that the target information is information of a notification type of the mobile terminal, display the target information in at least one of following manners:

displaying the target information for a preset duration;

continuously displaying, in response to determining that the target information comprises an event moment, the target information till time reaches the event moment;

displaying the target information at a receiving sequence within a preset region of a display screen; or displaying the target information in a scrolling mode within the preset region of the display screen.

15. A non-transitory computer-readable storage medium having stored thereon executable instructions that when executed by a processor, implement acts comprising:

sending, in response to determining that a target device is a trusted device of a mobile terminal, real-time target information of the mobile terminal to the target device to allow the target device to display the target information;

wherein sending the real-time target information of the mobile terminal to the target device comprises:

finding the target device;

determining that the target device is in a black screen state;

determining that the target device is the trusted device of the mobile terminal, sending to the target device a data synchronization instruction for the target device, and triggering the target device to determine the mobile terminal as a trusting device of the target device and to switch to a bright screen state after receiving the data synchronization instruction; and establishing a connection with the target device, and sending the real-time target information of the mobile terminal through the connection.

16. The non-transitory computer-readable storage medium of claim 15, wherein the executable instructions implement acts further comprising:

sending, in response to determining that the target information is information of a notification type, a name of an application to which the target information belongs to the target device to allow the target device to display the name of the application to which the target information belongs.

17. The non-transitory computer-readable storage medium of claim 15, wherein sending the real-time target information of the mobile terminal to the target device to allow the target device to display the target information comprises:

sending the real-time target information of the mobile terminal to the target device to allow the target device to display the target information in at least one of following manners:

displaying the target information for a preset duration;

continuously displaying, in response to determining that the target information comprises an event moment, the target information till time reaches the event moment;

displaying the target information at a receiving sequence within a preset region of a display screen; or displaying the target information in a scrolling mode within the preset region of the display screen.

\* \* \* \* \*